US011931758B2

(12) United States Patent
Carrithers

(10) Patent No.: US 11,931,758 B2
(45) Date of Patent: Mar. 19, 2024

(54) REVOLVING MAINTENANCE STATION FOR FLUID EJECTION DEVICE

(71) Applicant: Funai Electric Co., Ltd., Osaka (JP)

(72) Inventor: Adam D. Carrithers, Lexington, KY (US)

(73) Assignee: Funai Electric Co., Ltd. (JP)

( * ) Notice: Subject to any disclaimer, the term of this patent is extended or adjusted under 35 U.S.C. 154(b) by 68 days.

(21) Appl. No.: 17/805,499

(22) Filed: Jun. 6, 2022

(65) Prior Publication Data

US 2023/0390797 A1 Dec. 7, 2023

(51) Int. Cl.
*B05B 15/52* (2018.01)
*B05B 15/14* (2018.01)

(52) U.S. Cl.
CPC .............. *B05B 15/52* (2018.02); *B05B 15/14* (2018.02); *B08B 1/143* (2024.01)

(58) Field of Classification Search
CPC ......... B05B 15/52; B05B 15/14; B05B 15/50; B08B 1/006
USPC .................................................. 239/114, 115
See application file for complete search history.

(56) References Cited

U.S. PATENT DOCUMENTS 7,771,016 B2 8/2010 Lapstun et al.
7,997,683 B2 8/2011 Mealy et al.
9,616,668 B1 4/2017 Rabe et al.
9,782,971 B2 10/2017 Vernon et al.
10,512,921 B2 12/2019 Norasak et al.
2020/0317429 A1* 10/2020 Jancisin ................ B65D 83/34
2021/0323328 A1 10/2021 Rabe et al.

* cited by examiner

*Primary Examiner* — Christopher S Kim
(74) *Attorney, Agent, or Firm* — Luedeka Neely, P.C.

(57) ABSTRACT

A fluid ejection device that includes a housing, a fluid reservoir disposed in the housing and a fluid ejection head. A revolving maintenance station that includes an ejection head wiper and an ejection head capping device is movably attached to the housing and is configured for rotation to selectively position the ejection head wiper or the ejection head capping device adjacent to the fluid ejection head.

18 Claims, 11 Drawing Sheets

REVOLVING MAINTENANCE STATION FOR FLUID EJECTION DEVICE

TECHNICAL FIELD

The disclosure pertains to a revolving maintenance station for cleaning and sealing a fluid ejection head of a fluid ejection device.

BACKGROUND AND SUMMARY

Fluid jet ejection relies on ejecting miniscule droplets of a jetting fluid from the face of a fluid jet ejection head which is in fluidic communication with a fluid reservoir of the jetting fluid contained in the body of a fluid ejection device. Fluid jet ejection heads require "servicing" of a chip face of the ejection head including wiping and capping the chip face to maintain the operability of the fluid jet ejection head. Wiping the chip face removes dust, fluid spray, and crusting from a nozzle plate of the fluid jet ejection head which can negatively impact jetting performance. Once wiped, the chip face of the ejection head must be sealed or "capped" to prevent evaporation of the jetting fluid from nozzles in the nozzle plate which could lead to de-priming of the fluid jet ejection head.

Traditionally inkjet printing has been used to print images and text onto various substrates. The printhead is housed in a printer that moves the printhead in a linear motion across the substrate, with the substrate being moved perpendicularly to the motion of the printhead to create a two-dimensional image on the substrate. On typical inkjet printer systems, such as a desktop printer, the servicing method is well established and typically includes moving the printhead in a linear motion during printing and, once a print job has been completed, moving the printhead further in a linear direction to a service station where the printhead is driven across a wiping blade to remove debris. Once wiped, the printhead moves linearly further to a capping station where the chip face of the printhead is sealed. The service station and capping station in a conventional desktop printer are typically laterally adjacent to one another.

As fluid jet technology moves into new industries the ejection head may now be housed in small handheld devices where it is not possible to use traditional maintenance devices and methods. Accordingly, what is needed is a maintenance station or device that is not dependent on movement of a fluid ejection head laterally to a remote location for maintenance.

Accordingly, an embodiment of the disclosure provides a fluid ejection device that includes a housing, a fluid reservoir disposed in the housing and a fluid ejection head. A revolving maintenance station that includes an ejection head wiper and an ejection head capping device is movably attached to the housing and is configured for rotation to selectively position the ejection head wiper or the ejection head capping device adjacent to the fluid ejection head.

In another embodiment there is provided a handheld fluid ejection device that includes a housing, a fluid reservoir disposed in the housing and a fluid ejection head. A revolving maintenance station is provided and includes an ejection head wiper, an ejection head capping device, and a fluid ejection port therein. The revolving maintenance station is movably attached to the housing and is configured for rotation to selectively position the ejection head wiper, the ejection head capping device, or the fluid ejection port adjacent to the fluid ejection head.

In some embodiments, the ejection head capping device is configured to protect the fluid ejection head and to maintain an environment adjacent to the ejection head that prevents fluid from evaporating therefrom. In other embodiments, the ejection head capping device includes a vent therein.

In some embodiments, the revolving maintenance station further includes at least one tab on an inside wall thereof. In other embodiments, the housing includes a circular wall having at least one groove on an outside portion thereof for mating with the at least one tab of the revolving maintenance station.

In some embodiments, the revolving maintenance station is configured to be manually rotated relative to the housing. In other embodiments, the revolving maintenance station is configured to be automatically rotated relative to the housing.

In some embodiments, the ejection head wiper includes an elastomeric wiper blade.

In some embodiments, the ejection head capping devices is an elastomeric capping device.

In some embodiments, the revolving maintenance station further includes an absorbent wiper blade.

In some embodiments, the revolving maintenance station further includes a fluid ejection port therein.

In some embodiments, the revolving maintenance station further comprises at least one V-shaped tab on an inside wall thereof. In other embodiments, the housing includes a circular wall having at least one V-shaped groove on an outside portion thereof for mating with the at least one V-shaped tab of the revolving maintenance station.

In some embodiments, the revolving maintenance station is biased toward the housing.

An advantage of the revolving maintenance station is that the claimed maintenance station may include all of the components necessary to prevent an ejection head from drying out or clogging and the maintenance station can be easily operated manually or automatically to maintain the performance of the fluid ejection device. Unlike conventional rotating maintenance stations, the apparatus of the disclosed embodiments features an additional axis of motion perpendicular to the face of the fluid ejection head, thereby allowing an ejection head capping device to be positioned above and then lowered onto the face of the fluid ejection head. The capping device also provides a mechanism to ensure a secure seal between the capping device and the ejection head.

Another advantage of the disclosed embodiments is that the wiper blade is isolated from the fluid ejection head after the ejection head is wiped. The wiper blade may alternatively be positioned over a station where excess fluid can drip therefrom and be captured, or the wiper blade may be dragged across an absorbent material after wiping the face of the fluid ejection head so that any excess fluid is removed from the wiper blade. Thus, embodiments of the disclosure may prevent tacky fluids from remaining in contact with the face of the fluid ejection head since, after use, the wiper blade is isolated from the fluid ejection head unlike some conventional wipers.

DETAILED DESCRIPTION OF EMBODIMENTS

Figure 1:
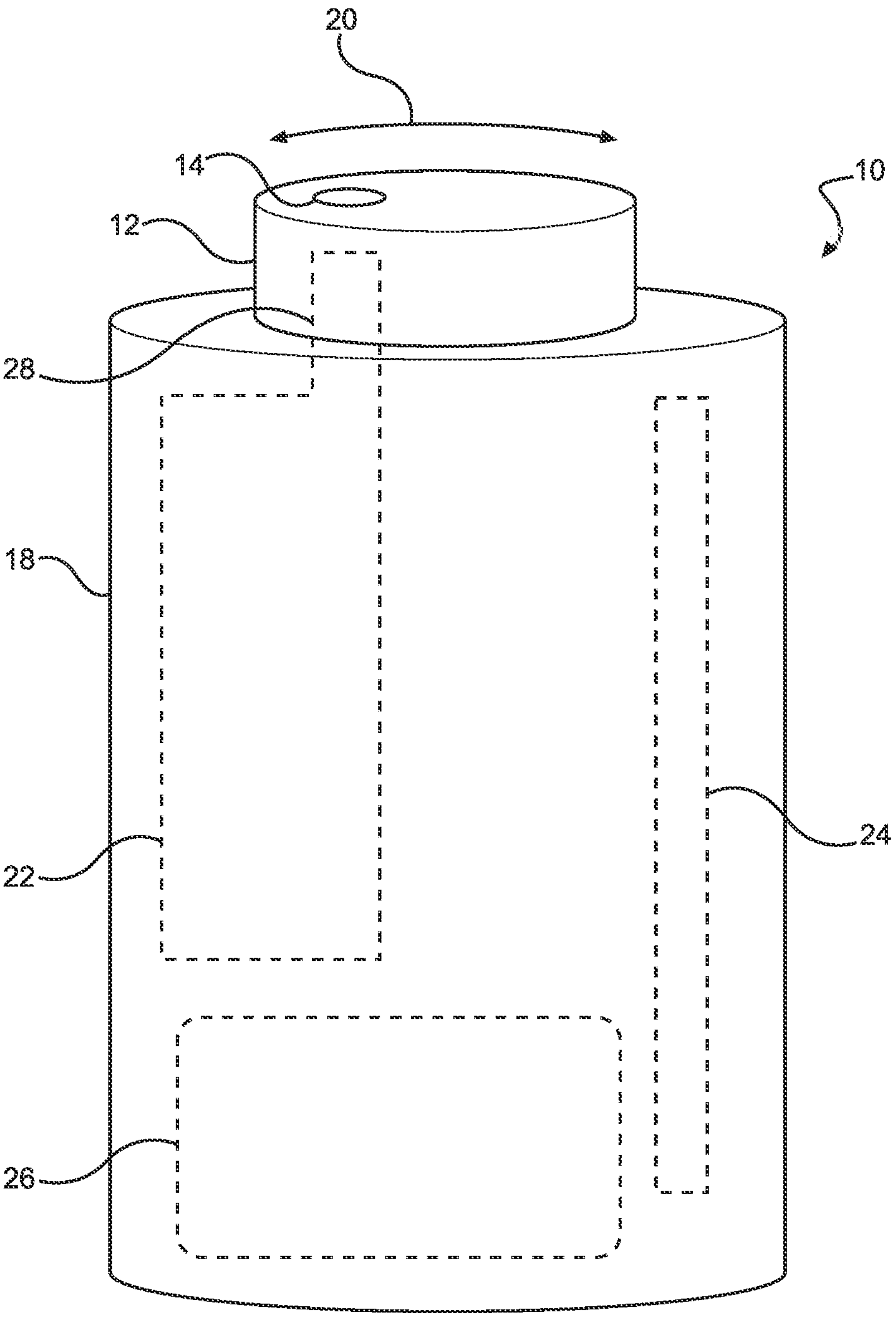
FIG. 1 is a perspective view, not to scale, of a handheld fluid ejection device containing a revolving maintenance station according to an embodiment of the disclosure.

With reference to FIGS. 1-4, there is provide a handheld fluid ejection device 10 that includes a revolving maintenance station 12. As described in more detail below, the maintenance station includes a wiper, an ejection head capping structure, and a fluid ejection port 14. The maintenance station 12 is rotatable about a circular wall 16 attached to the housing 18 in the direction of arrow 20 to provide wiping, ejection head capping and fluid ejection functions.

Handheld fluid ejection devices 10 are used for a variety of applications including, but not limited to, printing, lubrication, pharmaceutical delivery, vapor devices and the like. The fluid ejection devices are typically self-contained devices that include the housing 18, a fluid reservoir 22, a control circuit board 24, and a power supply 26.

Figure 2:
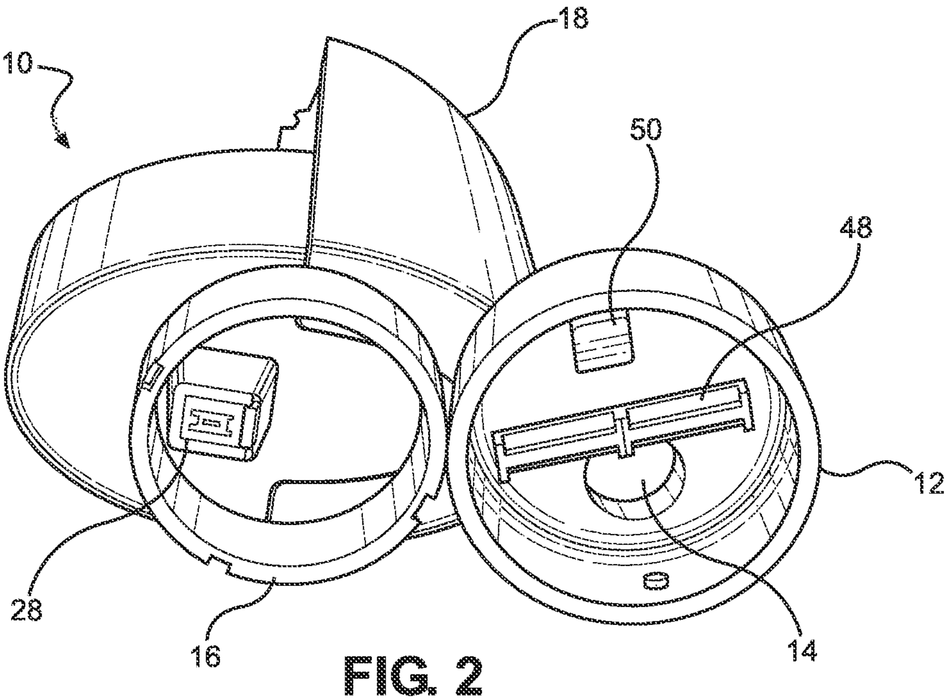
FIG. 2 is a perspective view from an ejection head end of the handheld fluid ejection device of FIG. 1 with the revolving maintenance station removed.
Figure 3:
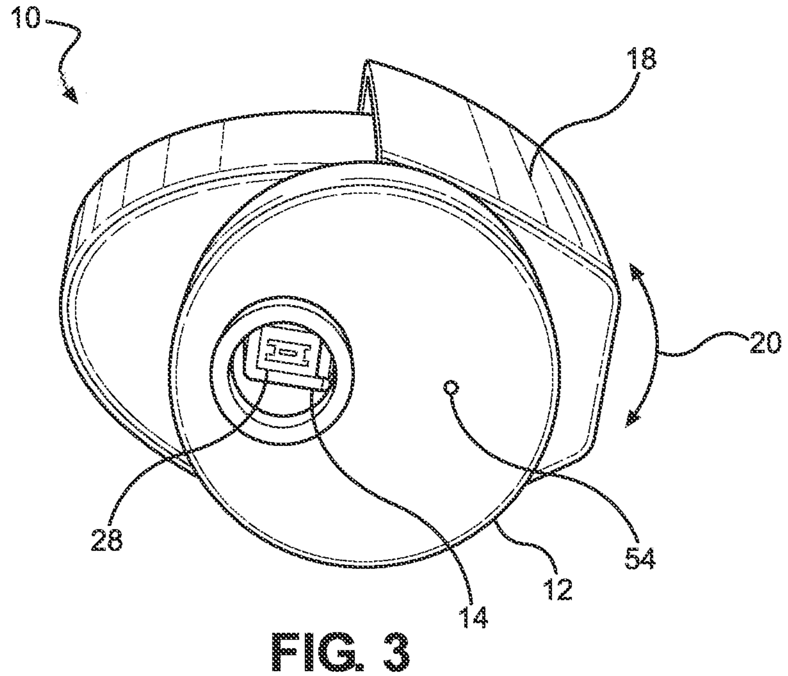
FIG. 3 is a perspective view from an ejection head end of the handheld fluid ejection device of FIG. 2 with the revolving maintenance station oriented in a fluid ejection orientation.
Figure 4:
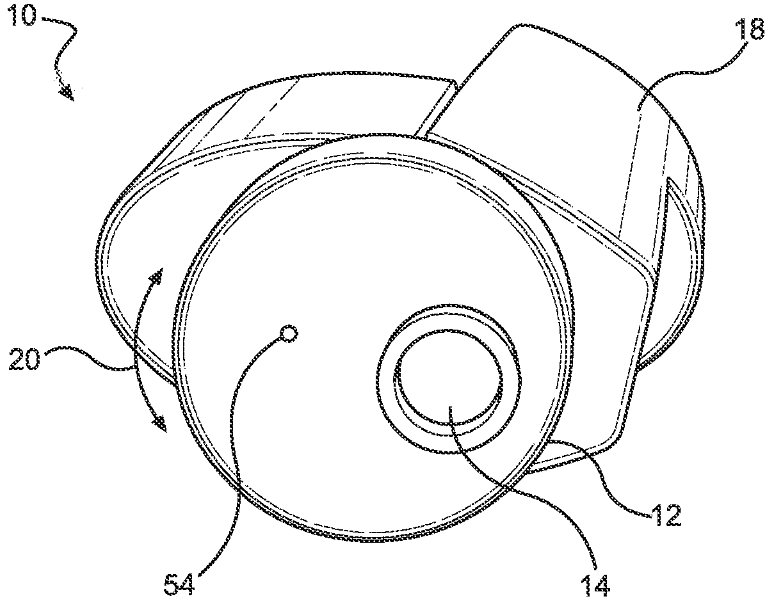
FIG. 4 is a perspective view from an ejection head end of the handheld fluid ejection device of FIG. 2 with the revolving maintenance station oriented in an ejection head capping orientation.

FIG. 2 is an end perspective view of the fluid ejection device 10 with a molding for the revolving maintenance station 12 removed thereby exposing a fluid ejection head 28. In FIG. 3, the revolving maintenance station 12 is rotated to a fluid ejection orientation, the fluid ejection head 28 is adjacent to the fluid ejection port 14. FIG. 4 is an end perspective view of the fluid ejection device 10 wherein the revolving maintenance station 12 is rotated to an ejection head capping orientation.

The revolving maintenance station 12 may be mated to the circular wall 16 attached to the housing 18 of the handheld fluid ejection device 10 in a variety of ways. A first embodiment is shown in FIGS. 5-11, where the revolving maintenance station 12 includes tabs 30 (FIG. 6) extruded on an inner wall 32 thereof which can be fitted into grooves 34 on the outer wall 36 of the circular wall 16. It would be apparent to one skilled in the art that alternatively, tabs may be placed on the outer wall 36 of the housing 18 and that the grooves may be provided on the inner wall 32 of the revolving maintenance station 12. The grooves 34 in the outer wall 36 of the housing 18 enable for the revolving maintenance station 12 to rotate around the circumference of the circular wall 16 and to be seated in the appropriate locations for either fluid ejection or for capping the fluid ejection head 28 with an ejection head capping device 38. The tabs 30 may include circular tabs 30*a* and rectangular tabs 30*b* on the revolving maintenance station 12 that mate with particular grooves 34 on the outer wall 36 of the housing 18 so that either the ejection head capping device 38 or the fluid ejection port 24 is adjacent to the fluid ejection head 28.

Figure 5:
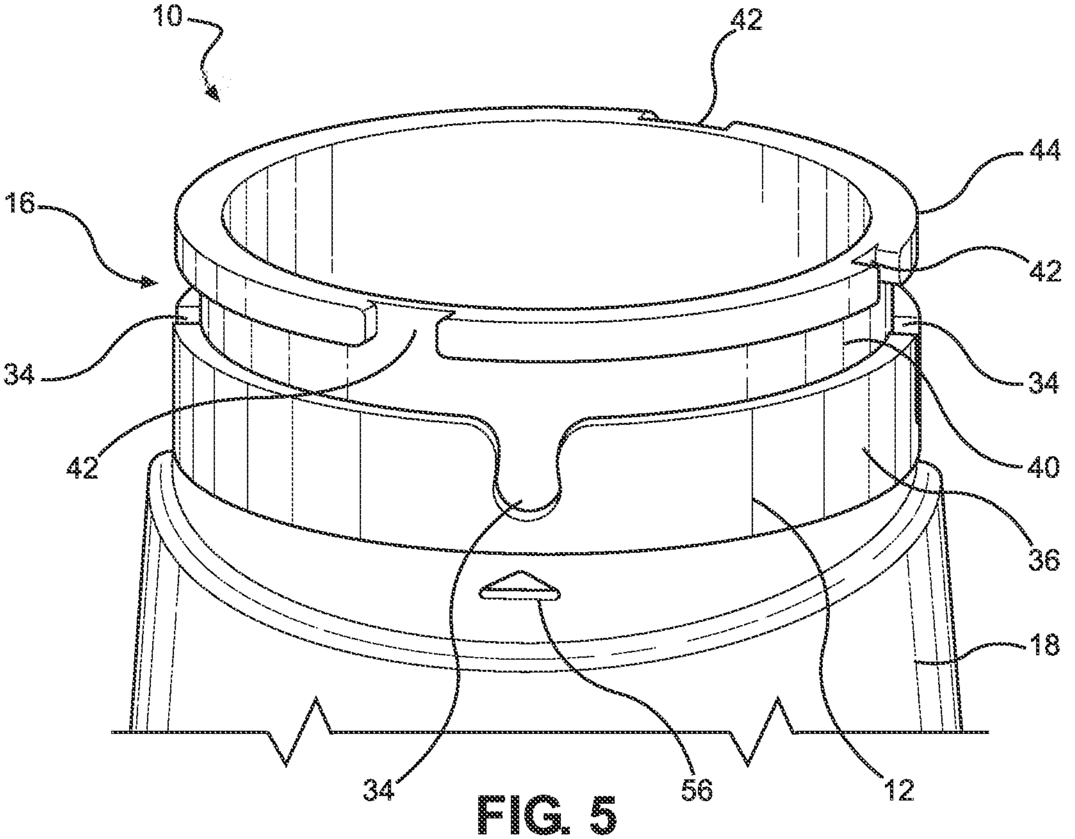
FIG. 5 is a perspective view of a portion of the handheld fluid ejection device of FIG. 1 with the revolving maintenance station removed.
Figure 6:
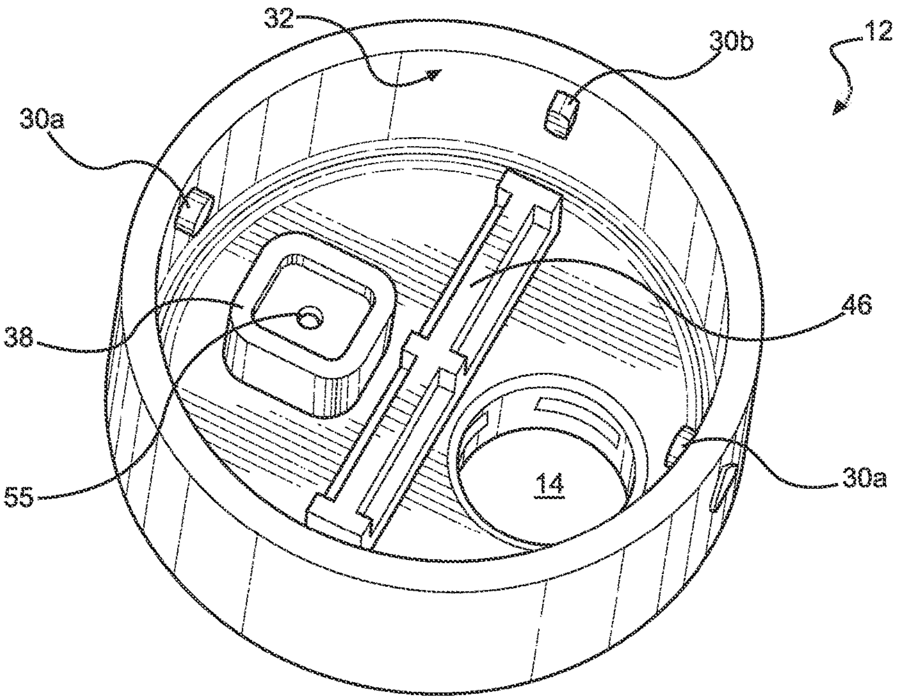
FIG. 6 is an inside perspective view of a revolving maintenance station for the handheld fluid ejection device of FIG. 1.
Figure 7:
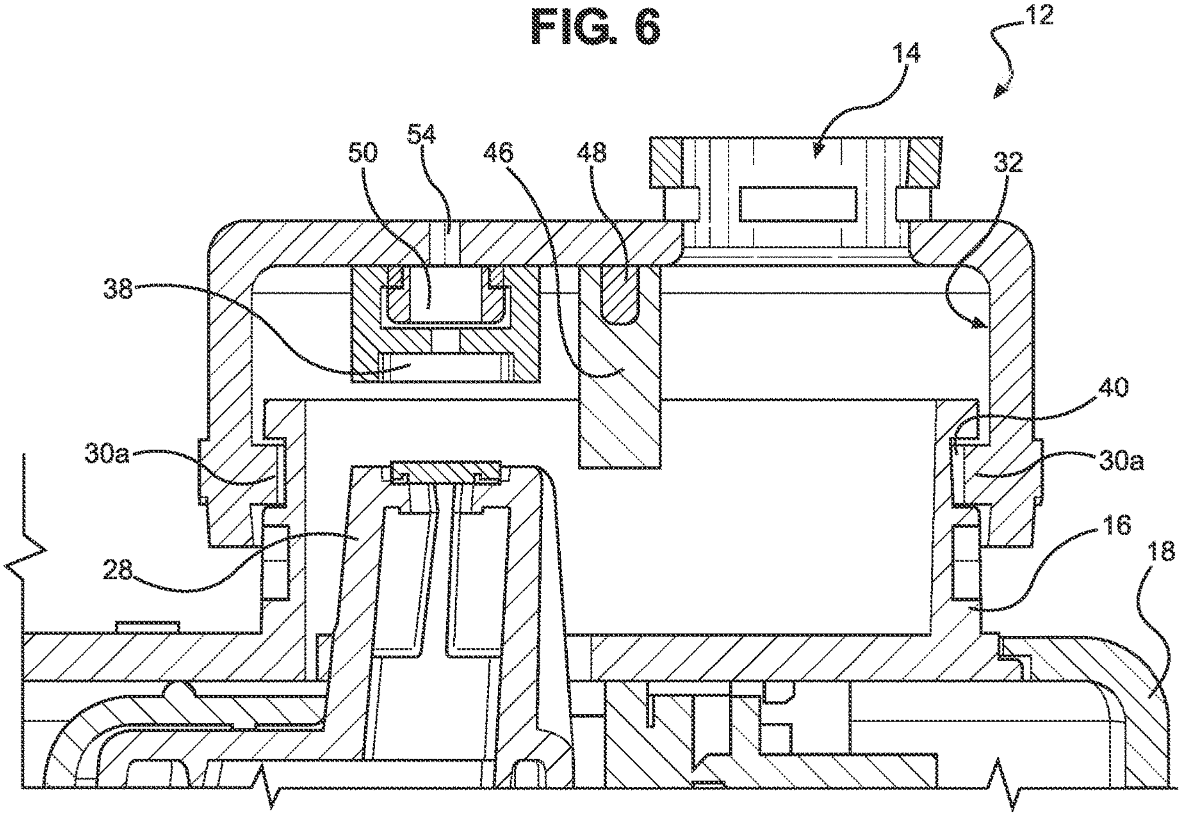
FIG. 7 is a cross-sectional view of the revolving maintenance station and fluid ejection device of FIG. 1 with the revolving maintenance station in an extended position relative to an ejection head capping device.
Figure 8:
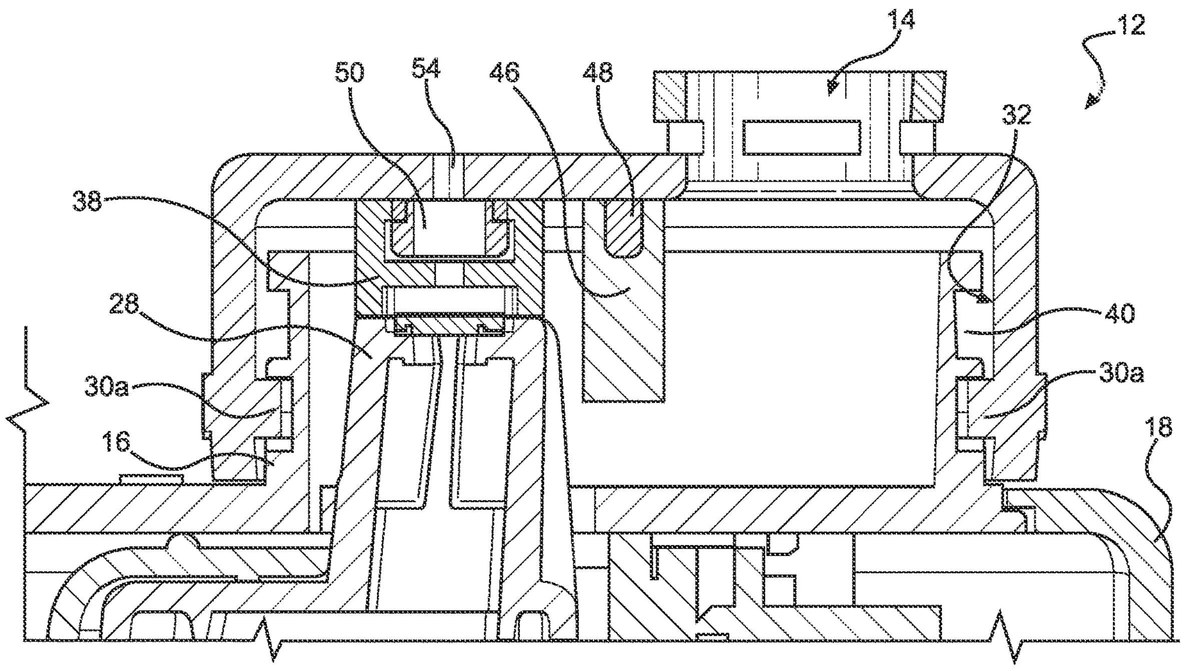
FIG. 8. is a cross-sectional view of the revolving maintenance station and fluid ejection device of FIG. 7 with the revolving maintenance station in a retracted position relative to the ejection head capping device.
Figure 9:
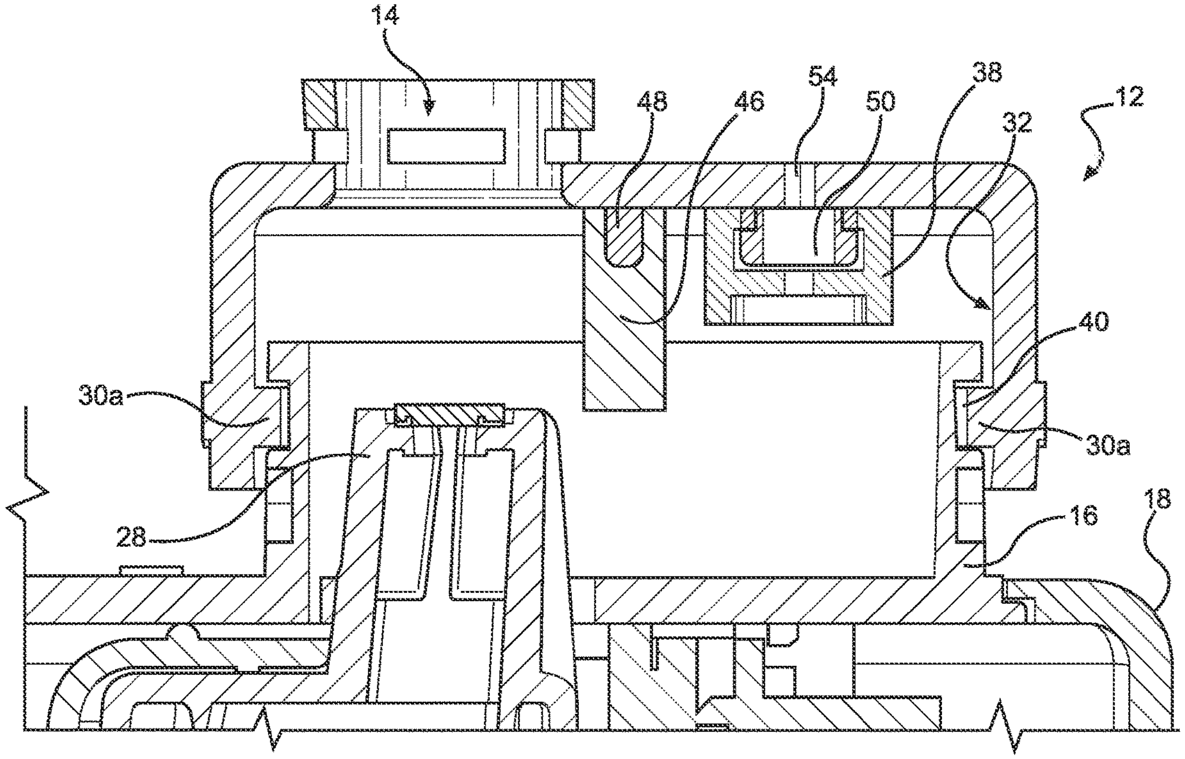
FIG. 9 is a cross-sectional view of the revolving maintenance station and fluid ejection device of FIG. 1 with the revolving maintenance station in an extended position relative to a fluid ejection port.
Figure 10:
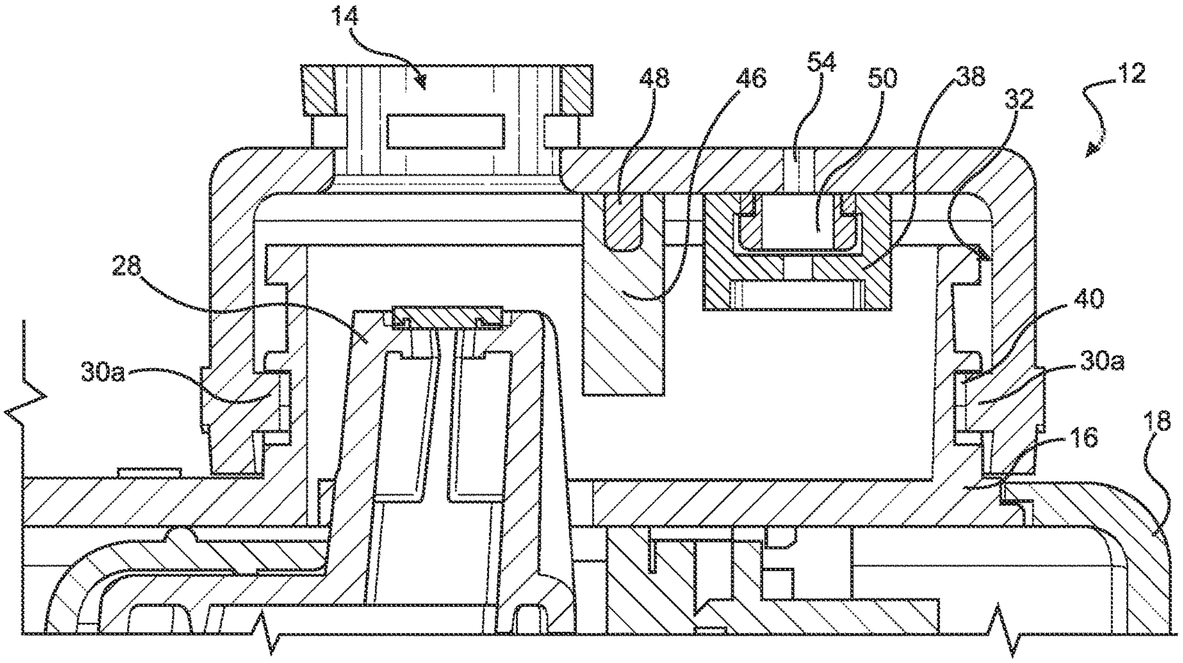
FIG. 10 is a cross-sectional view of the revolving maintenance station and fluid ejection device of FIG. 1 with the revolving maintenance station in a retracted position relative to the fluid ejection port.

In the embodiment illustrated in FIG. 5, a race 40 is provided in the circular wall 16 for retaining the tabs 30 therein. Slots 42 in a retainer ring 44 enable the revolving maintenance station 12 to be removed from the circular wall 16 for reconditioning components of the revolving maintenance station 12. A noteworthy feature of revolving maintenance station 12 is that the maintenance station 12 is readily replaceable so that the wiper blade 46 and capping device do not become excessively degraded. Either the entire maintenance station assembly can be replaced, or the maintenance station 12 may be designed so that only the wiper blade 46 and capping device 38 are replaceable while maintaining the main body of the maintenance station 12. Interchangeable wiper blades 46 and capping devices 38 provide an economical and environmental benefit for both the user and manufacturer. Accordingly, the wiper blade 46 may be removably attached to a wiper blade holder 48 and the ejection head capping device 38 may be removably attached to a capping device holder 50 by a user so that the capping and wiping operations may be maintained throughout the life of the handheld fluid jet ejection device 10.

Each of the wiper blade 46 and ejection head capping device 38 may be made of a resilient elastomeric material that provides suitable wiping and sealing characteristics. In some embodiments, the wiper blade 46 and capping device 38 are made of a natural or synthetic rubber. Accordingly, the wiper blade 46 is positioned so that, when the maintenance station 12 is in the operating position, rotating the maintenance station 12 results in engagement of the wiper blade 46 with the face of the fluid ejection head 28 thereby removing and debris or excess fluid before the fluid ejection head 28 is capped. In a first embodiment, the wiper blade 46 is positioned so that rotating the station in either direction provides the cleaning action desired before capping.

Figure 12:
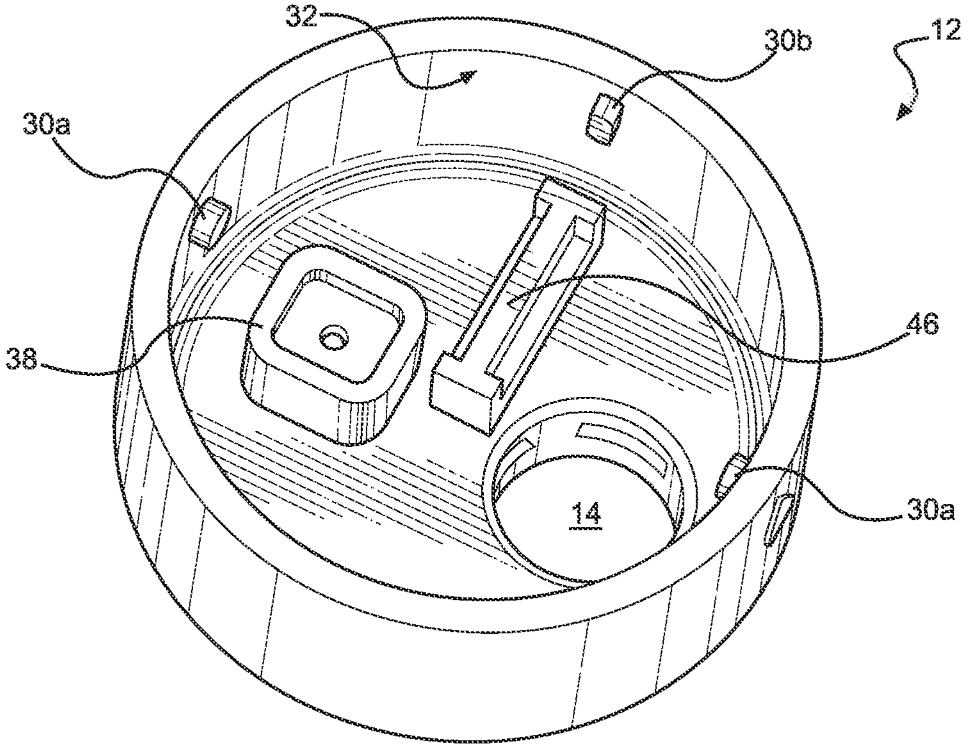
FIGS. 12 and 13 are inside perspective views of revolving maintenance stations for the handheld fluid ejection device of FIG. 1 according to other embodiments of the disclosure.

In some embodiments, a unidirectional rather than a bi-directional wiping motion is provided. Unidirectional wiping prevents the chance that a return wipe across the ejection head 28 could result in recontamination of the ejection head 28 with debris from the wiper blade 46. Accordingly, a ratchet-like mechanism may be provided to ensure that the maintenance station 12 is only rotated in a single direction so that the wiping is unidirectional. The single direction of rotation allows for the size of the wiper blade 46 to be reduced and placed on only a single side of the maintenance station 12 between the fluid ejection port 14 port and the capping device 38 as shown in FIG. 12.

Figure 13:
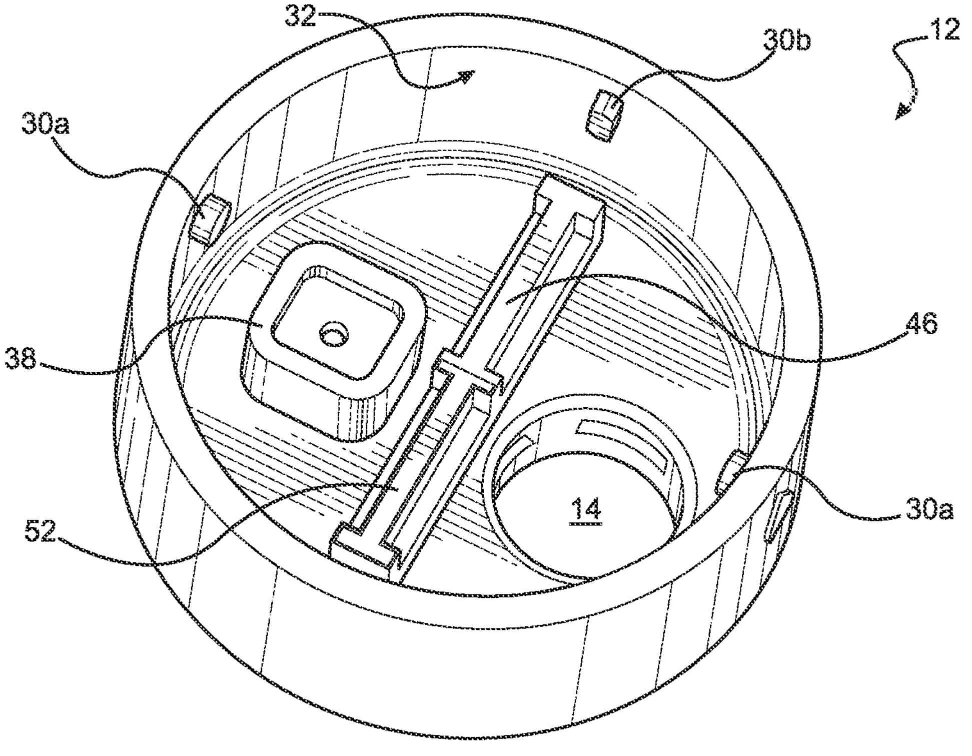
Figure 14:
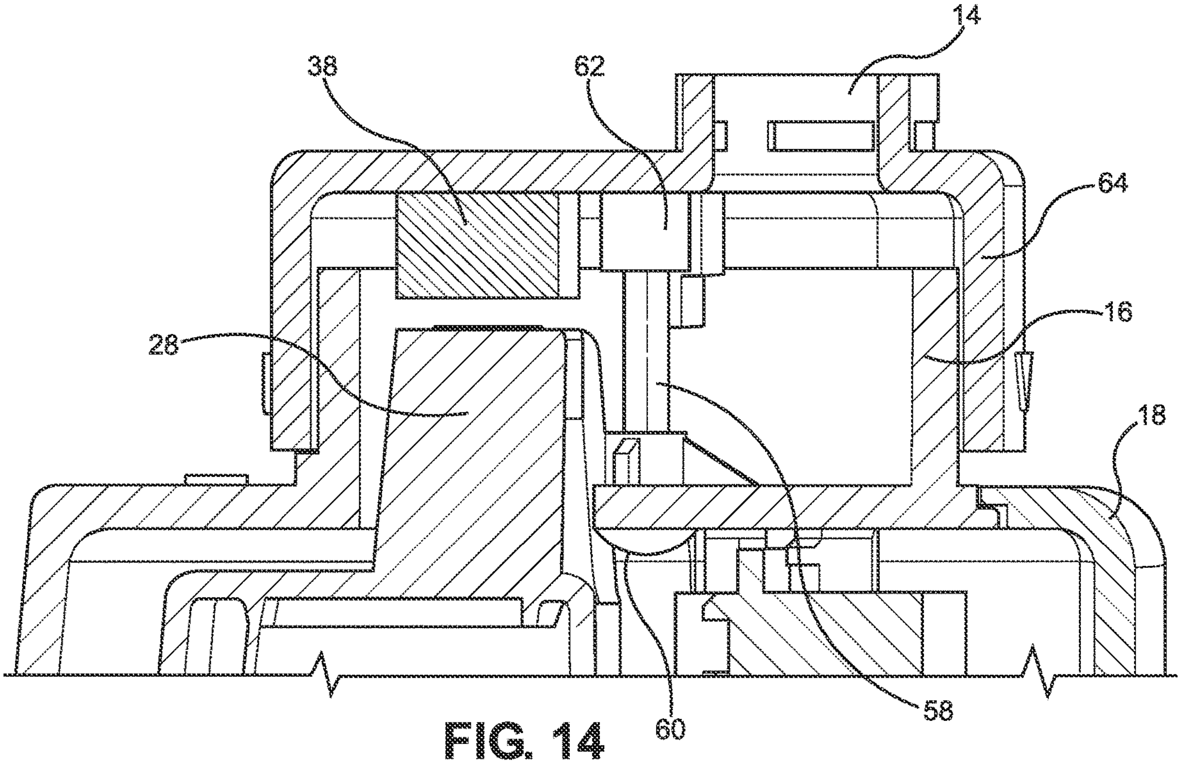
FIGS. 14-16 are cross-sectional views of a revolving maintenance station and fluid ejection device according to another embodiment of the disclosure.
Figure 15:
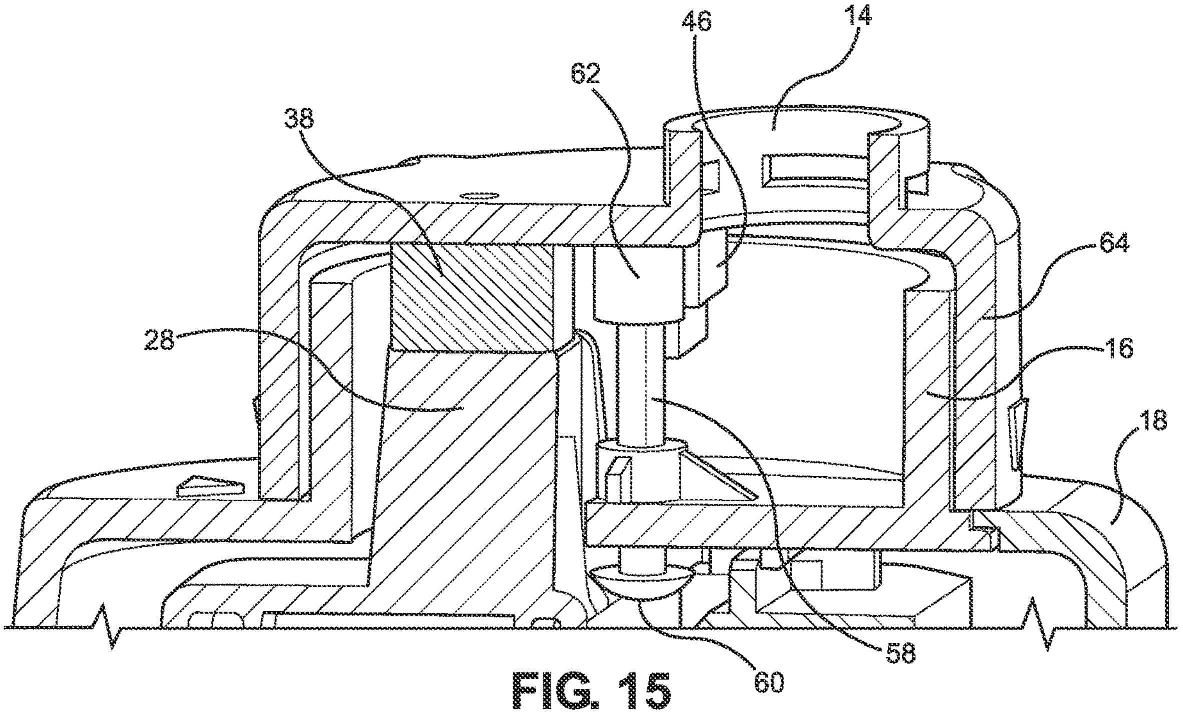

In another embodiment, a wiper 52 made of an absorbent material may be placed opposite of the wiper blade 46 as shown in FIG. 13. The absorbent wiper 52 may engage the face of the ejection head 28 prior to aligning the fluid ejection port 14 with the ejection head 28 and prior to operating the device. The absorbent properties of the absorbent wiper 52 may be used to prime the ejection head 28 by providing a wicking action with respect to the fluid to be ejected. Accordingly, the absorbent wiper 52 may be made in various sizes to increase the duration of contact with the ejection head 28. An absorbent wiper 52, as described above, would be impractical to implement in a conventional maintenance station, where an absorbent blade could only appear in series with the wiping blade.

In some embodiments, ejection head capping device 38 may seal directly onto a face of fluid ejection head 28 or may encompass an entirety of fluid ejection head 28. Accordingly, the ejection head capping device 38 is meant to provide protection for the fluid ejection head 28 and to maintain a locally humid environment to prevent evaporation of the jetting fluid from nozzles of fluid ejection head 28. The ejection head capping device 38 may also feature a vent hole 55 therein to relieve pressure on the fluid ejection head 28 when seating the capping device 38 into a resting position over fluid ejection head 28. The vent 54 may also provide an airflow path from an outside ambient atmosphere into the fluid ejection head 28 so that when a fluid is jetted a vacuum does not form inside the revolving maintenance station 12. Typically, such vent 54 is sufficiently small so that the humidity inside the capping device 38 remains relatively high.

In some embodiments, indicia 56 (FIG. 5) may be provided on the housing 18 to indicate the position of the revolving maintenance station 12. For a station which is manually rotated by the user, indicator marks located on the housing 18 and corresponding indicia 56 located on an outer wall of the maintenance station 12 may help the user identify the correct rotational positioning of the maintenance station 12 with respect to the ejection head 28. Other means of indicating the correct position such as multi-colored or flashing lights, or audible cues may be used alone or in combination to alert a user of the correct positioning of the maintenance station 12. Errors in positioning of the maintenance station 12 may also be indicated by any of the foregoing indicia, lights or sounds.

Figure 11:
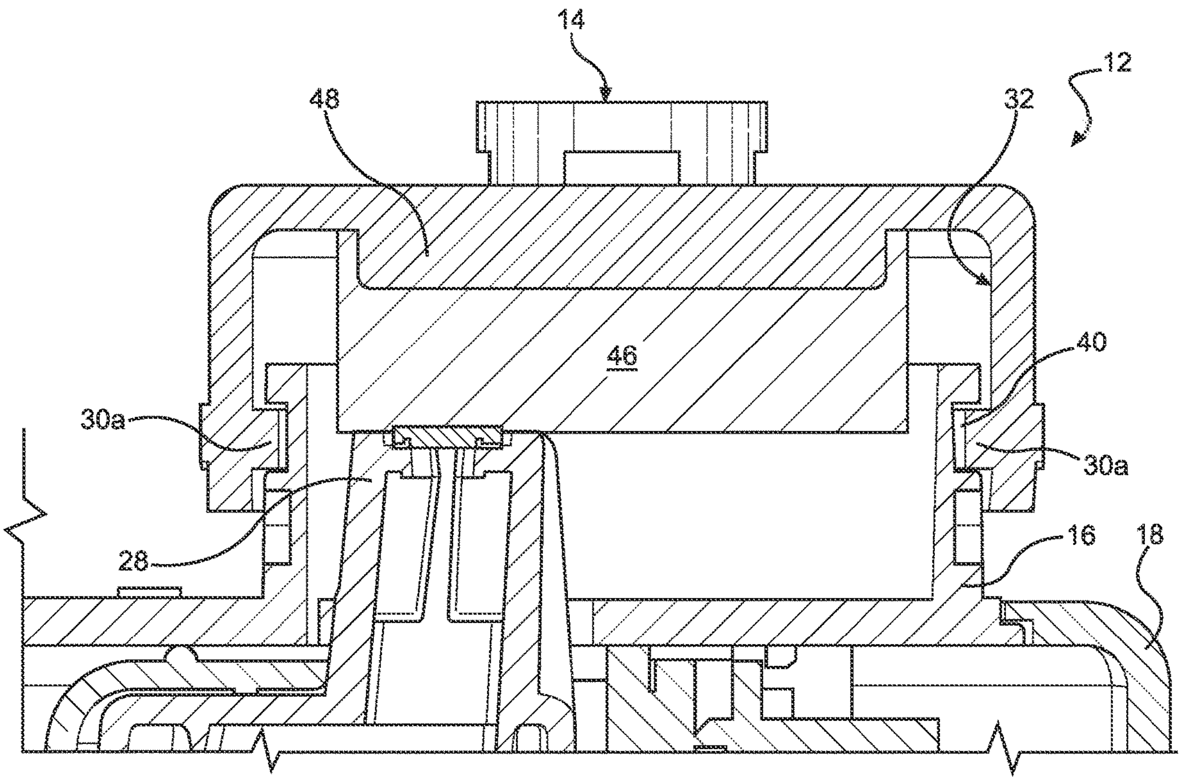
FIG. 11 is a cross-sectional view of the revolving maintenance station and fluid ejection device of FIG. 1 with the revolving maintenance station in an extended position for wiping a fluid jet ejection head.

As shown in FIGS. 7-11, the revolving maintenance station 12 may be operated to an extended position (FIG. 7) and retracted into a resting position (FIG. 8) with the ejection head capping device 38 adjacent to the fluid ejection head 28. The revolving maintenance station may also be extended (FIG. 9) and rotated into an operating position (FIG. 10) with the fluid ejection port 14 adjacent to the fluid ejection head 28. After ejecting fluid from the fluid ejection head 28, the revolving maintenance station may again be extended (FIG. 9) and rotated back to the resting position (FIG. 8) while the wiper blade 46 sweeps across the fluid ejection head 28 as shown in FIG. 11. In some embodiments the foregoing revolving maintenance station may be manually extended, rotated, and retracted by a user.

As described above, the revolving maintenance station 12 may be extended and retracted in a direction perpendicular to a face of the fluid ejection head 28. In some embodiments, the revolving maintenance station 12 is designed so that it must be extended before rotation, or the revolving maintenance station 12 may be designed so that rotation drives the extension of the revolving maintenance station 12 such as by providing V-shaped grooves and V-shaped tabs.

Figure 16:
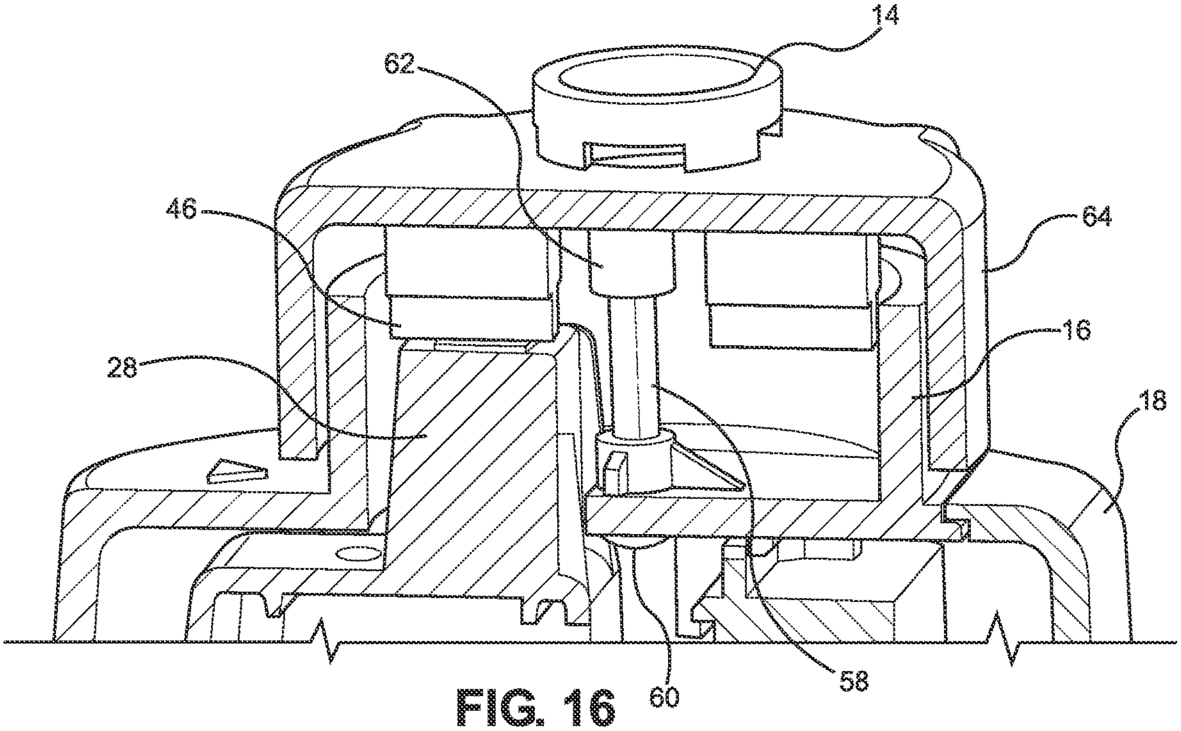

In some embodiments, illustrated in FIGS. 14-17, a central shaft 58, having a first end mounted to the housing 18 and a second end that extends beyond the circular wall 16 may be provided. The first end of the central shaft 58 may be affixed to a stopper 60 and the second end of the central shaft may be mated to a hole or boss 62 located at the center of the revolving maintenance station 64. Upper and lower limits for the stopper are provided to enable vertical travel of the revolving maintenance station 12 so that the revolving maintenance station 64 may be extended (FIG. 14) and retracted into a resting position (FIG. 15) with the ejection head capping device 38 adjacent to the fluid ejection head 28. As shown in FIG. 16, the revolving maintenance station 64 may be extended and rotated while the wiper blade 46 sweeps across the fluid ejection head 28. In some embodiments the foregoing revolving maintenance station may be manually extended, rotated, and retracted by a user.

Figure 17:
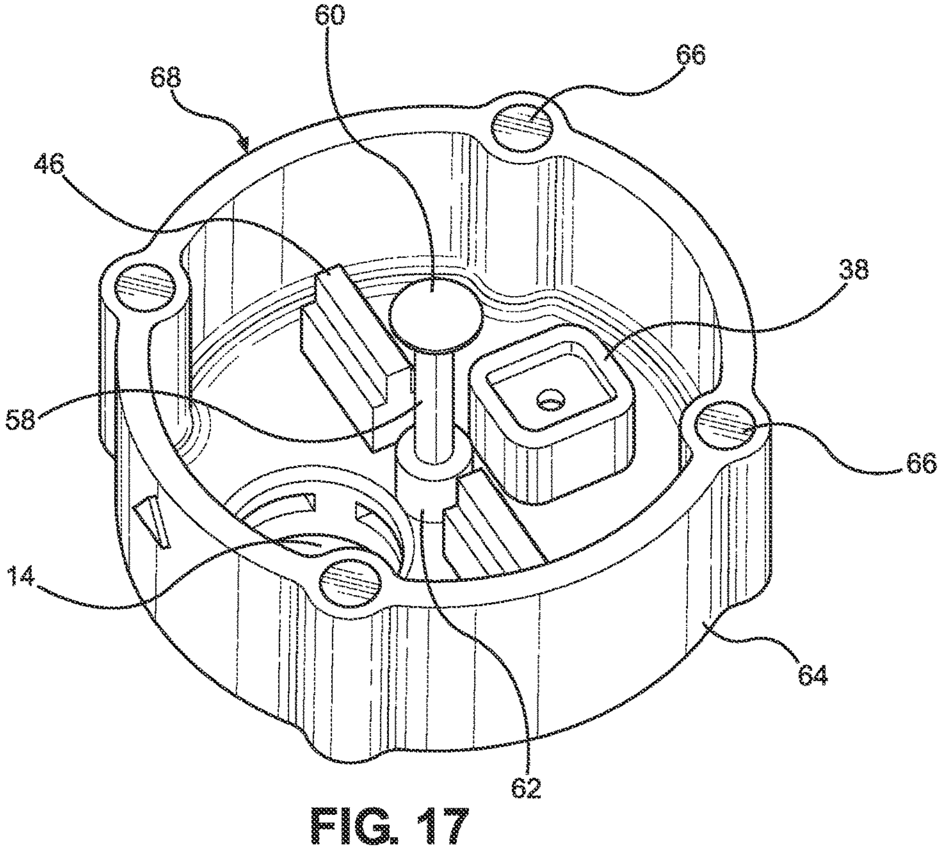
FIG. 17 is an inside perspective view of a revolving maintenance station containing magnets for alignment according to another embodiment of the disclosure.
Figure 18:
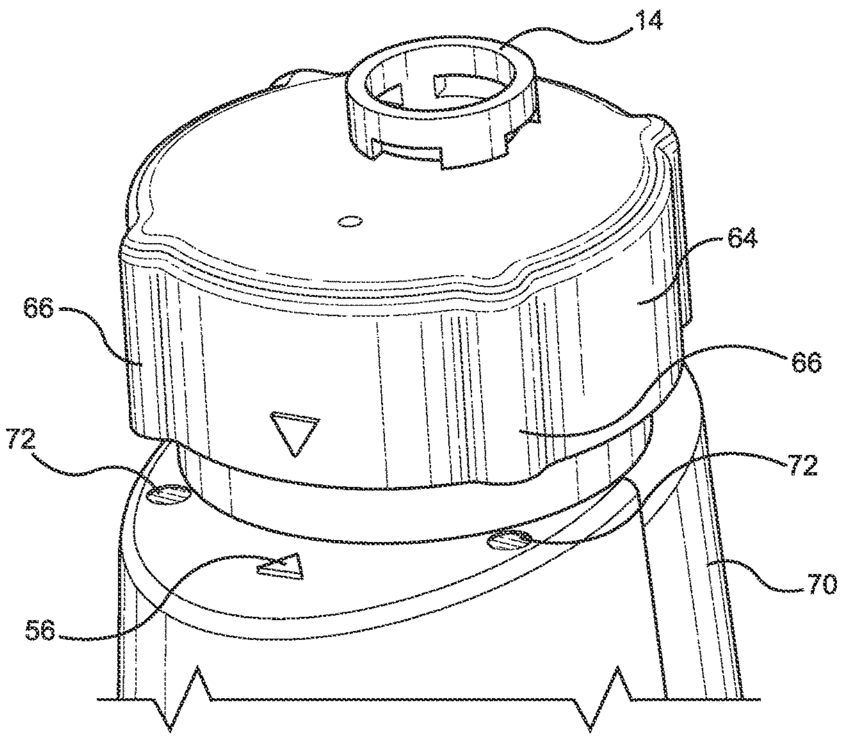
FIG. 18 is a perspective view of the revolving maintenance station of FIG. 17 attached to a housing of a fluid ejection device.
Figure 19:
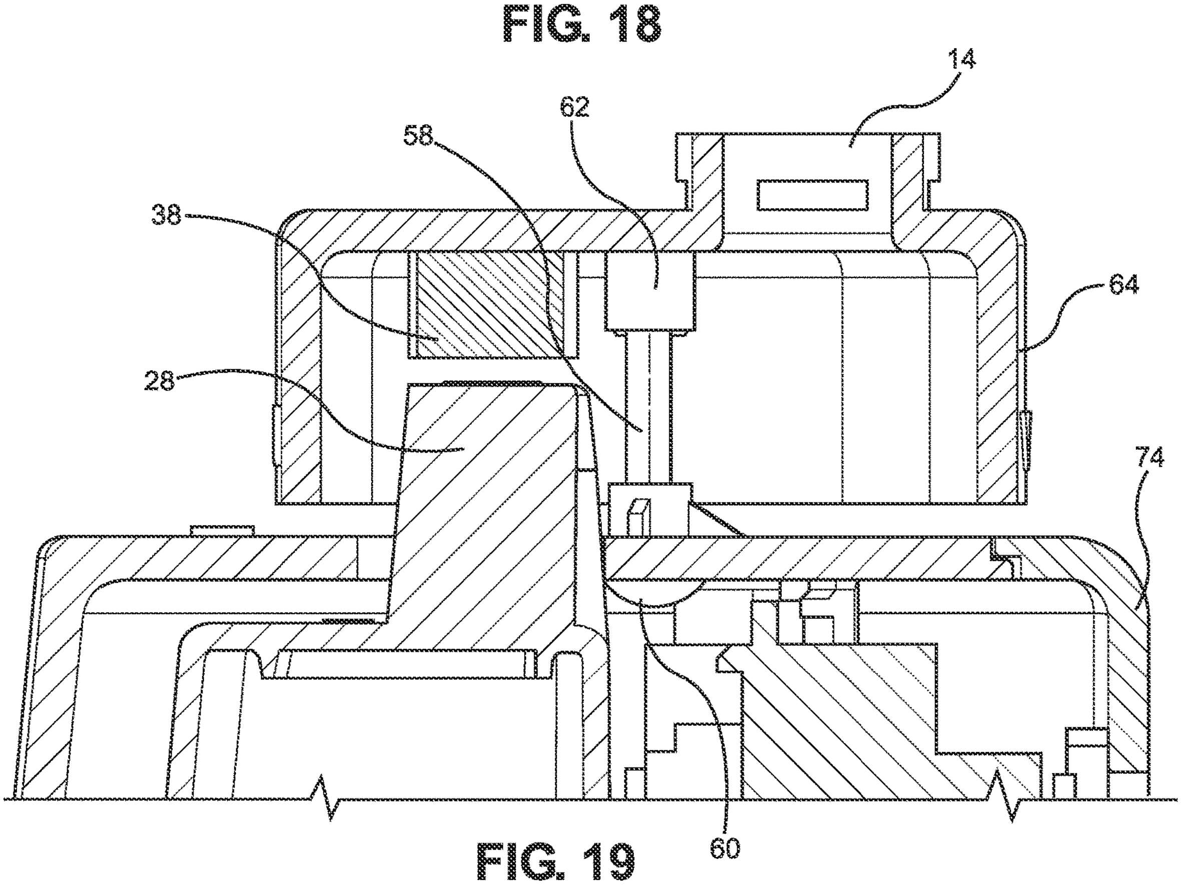
FIG. 19 is a cross-sectional view of a revolving maintenance station and fluid ejection device according to another embodiment of the disclosure.

FIG. 17 is an inside perspective view of the revolving maintenance station 64 and central shaft 58. One or more embedded magnets 66 may be provided on a circumferential edge 68 of the maintenance station 64 to aid in aligning the maintenance station 64 with the housing 70 of the fluid ejection device. Accordingly, the housing 70 may include magnets 72 or metal inserts as shown in FIG. 18 to maintain proper positioning and alignment of the revolving maintenance station 64. When the embedded magnets 66 and 72 are used for aligning the revolving maintenance station 64 with the housing 74, there is no need for the circular wall 16 or grooves 34 (FIG. 5) to provide alignment of the revolving maintenance station 64 with the housing 74. Accordingly, the housing 74 may be provided as shown in FIG. 19 without the circular wall 16.

Figure 20:
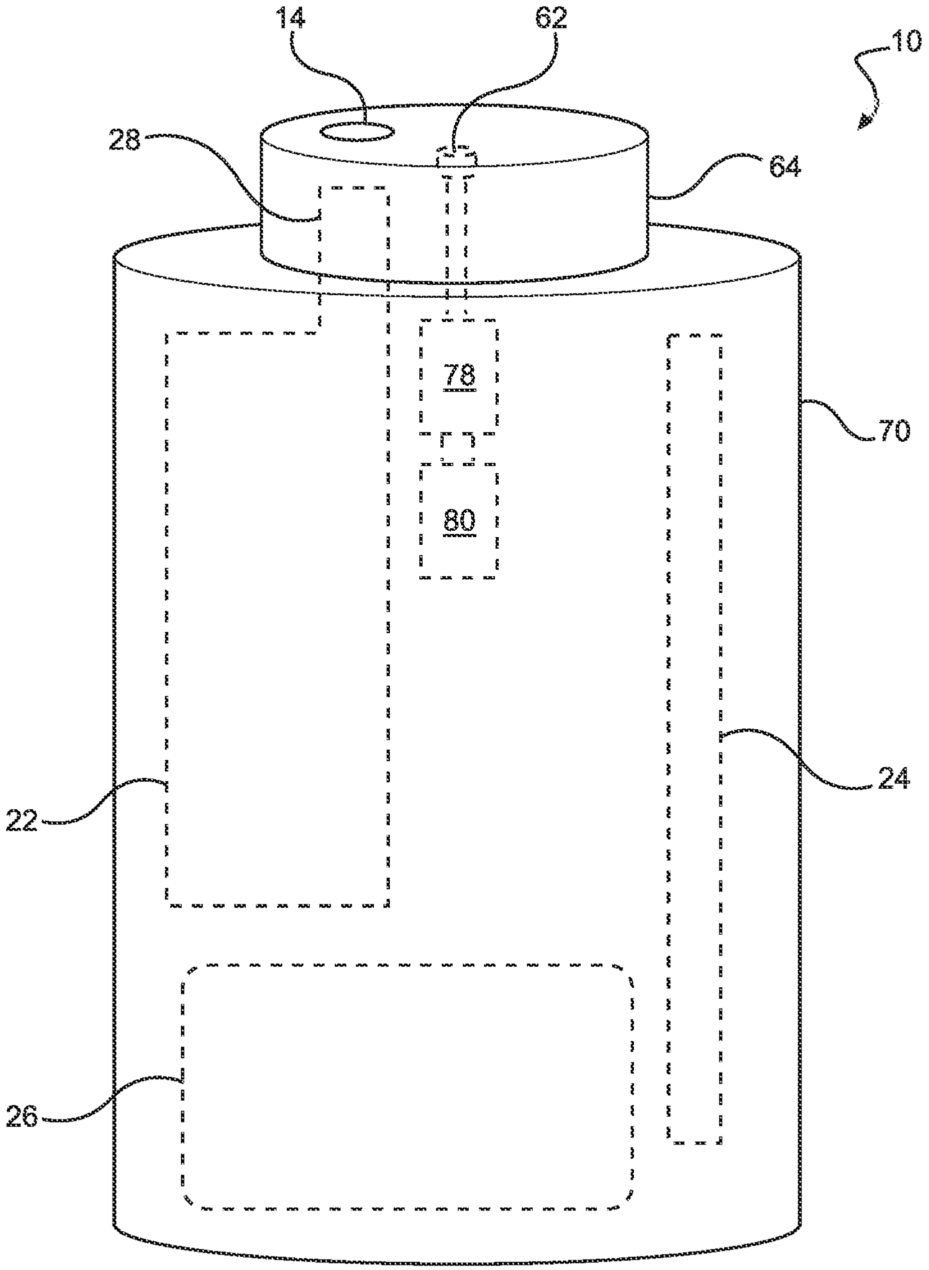
FIG. 20 is a schematic view of an automated revolving maintenance station according to another embodiment of the disclosure.

In some embodiments, the central shaft 76 is attached to a stepper motor 78 (FIG. 20) rather than floating inside the housing 70 for use in repositioning the revolving maintenance station 64. The stepper motor 78 enables radial motion of the revolving maintenance station 64. The stepper motor 78 may also be mounted to a linear actuator 80 to provide motion of the revolving maintenance station 64 in a direction coaxial to the central shaft 76 to enable the revolving maintenance station 64 to be lifted before rotating to its next position and then reseated. The linear actuator 80 is provided with enough torque to overcome the resistance of the magnets 66 and 72 holding the maintenance station 64 in a resting position.

The linear actuator 80 and stepper motor 78 may also be designed to hold the position of the revolving maintenance station 64 until activated by a user or could be used in conjunction with the tabs 30 and groove 34 or magnets 66 and 72 to maintain the correct position of the revolving maintenance station 64. It is conceivable that the linear actuator 80 may be programmed to apply a downward force while the wiper blade 46 is moving across the face of the fluid ejection head 28 to ensure engagement between the fluid ejection head 28 and the wiper blade 46. It is further conceivable that the linear actuator 80 may be paired with a force sensor so that a predetermined amount of force can be applied to the fluid ejection head 28 by the wiper blade 46 to help alleviate any error in manufacturing tolerances or degradation of the wiper blade 46 over time. In some embodiments, the automatic maintenance station may be programmed to only rotate in a single direction.

Although the revolving maintenance station and its compact design are primarily aimed towards handheld fluid ejection devices, it is also conceivable that the revolving maintenance station described herein could be used in larger, stationary fluid ejection devices. Such a maintenance station would likely not require a fluid ejection port, as these devices typically translate the fluid ejection head to a desired fluid ejection location. Once an ejection head reaches its home position, a revolving maintenance station may be used to wipe and cap the ejection head using the actuating and rotating mechanisms as described above for the automatic maintenance station for a handheld fluid ejection device. While it is conceivable that the maintenance station may exist without a fluid ejection port for larger, stationary fluid ejection devices, for the handheld fluid ejection device it is convenient and compact to include a fluid ejection port through which fluid can be dispensed. The fluid ejection port may also feature various means by which to attach various diffusers and adapters to modify the behavior and flow of the jetted fluid. Such means may include clips, press fits, snap fits, threading, or magnets.

Accordingly, the disclosed embodiments provide an apparatus and method for using a revolving maintenance station to wipe and cap the fluid ejection head. The handheld fluid ejection device includes only a few components: the revolving maintenance station, a fluid ejection head, a housing, a fluid reservoir, a circuit board and a power supply. The fluid ejection head and fluid reservoir are housed in the body of the housing all with all the electrical components necessary to operate the fluid ejection head.

Although the embodiment shown in the figures demonstrates a round maintenance station, it is appreciated that one skilled in the art could envision similar devices featuring a maintenance station using various shapes or sizes. The unique characteristic of the disclosed embodiments pertains to the revolving nature of the mechanism, which allows for a compact arrangement of the components necessary for fluid ejection head maintenance. As set forth above, the mechanism may be manually or automatically actuated by the user and contains readily replaceable and maintainable components. Unlike conventional servicing stations, the revolving maintenance station features a built-in fluid ejection port so that the ejection head does not need to be translated to a separate position before dispensing a fluid.

The currently disclosed apparatus acts as both the maintenance station and a storage housing for the fluid ejection head. As the maintenance station is rotated, multiple maintenance steps may be placed in series around the inside wall of the maintenance station to aid in both priming and cleaning the fluid ejection head.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A fluid ejection device comprising:

a housing, a fluid reservoir disposed in the housing and a fluid ejection head configured for ejecting a fluid supplied from the fluid reservoir; and a revolving maintenance station comprising an ejection head wiper blade and a separate ejection head capping device having a vent therein, wherein the revolving maintenance station is movably attached to the housing and is configured for rotation to selectively abut the fluid ejection head with the ejection head wiper blade and the ejection head capping device.

2. The fluid ejection device of claim 1, wherein the ejection head capping device is configured to protect the fluid ejection head and to maintain an environment that prevents the fluid from evaporating from the fluid ejection head.

3. The fluid ejection device of claim 1, wherein the revolving maintenance station further comprises at least one tab on an inside wall thereof.

4. The fluid ejection device of claim 3, wherein the housing further comprises a circular wall having at least one groove on an outside portion thereof for mating with the at least one tab of the revolving maintenance station.

5. The fluid ejection device of claim 1, wherein the revolving maintenance station is configured to be manually rotated relative to housing.

6. The fluid ejection device of claim 1, wherein the revolving maintenance station is configured to be automatically rotated relative to the housing.

7. The fluid ejection device of claim 1, wherein the ejection head wiper blade comprises an elastomeric wiper blade.

8. The fluid ejection device of claim 1, wherein the ejection head capping devices comprises an elastomeric capping device.

9. The fluid ejection device of claim 1, wherein the ejection head wiper blade comprises an absorbent wiper blade.

10. The fluid ejection device of claim 1, wherein the revolving maintenance station further comprises a fluid ejection port therein.

11. The fluid ejection device of claim 1, further comprising a central shaft configured to movably attach the revolving maintenance station to the housing.

12. A handheld fluid ejection device comprising:

a housing, a fluid reservoir disposed in the housing and a fluid ejection head configured for ejecting a fluid supplied from the fluid reservoir; and a revolving maintenance station comprising an ejection head wiper blade, ejection head capping device having a vent therein, and a fluid ejection port therein, wherein the revolving maintenance station is movably attached the housing and is configured for rotation to selectively abut the fluid ejection head with the ejection head wiper blade, the ejection head capping device, and the fluid ejection port.

13. The handheld fluid ejection device of claim 12, wherein the revolving maintenance station is configured to be manually rotated relative to the housing.

14. The handheld fluid ejection device of claim 12, wherein the revolving maintenance station further comprises at least one V-shaped tab on an inside wall thereof.

15. The handheld fluid ejection device of claim 14, wherein housing further comprises a circular wall having at least one V-shaped groove on an outside portion thereof for mating with the at least one V-shaped tab of the revolving maintenance station.

16. The handheld fluid ejection device of claim 15, wherein the revolving maintenance station is biased toward the housing.

17. The handheld fluid ejection device of claim 12, further comprising a central shaft attached to the housing, wherein the revolving maintenance station is movably attached to the central shaft.

18. The handheld fluid ejection device of claim 12, further comprising magnets disposed on the housing, on the revolving maintenance station, or on the housing and the revolving maintenance station configured to selectively position the revolving maintenance station.

* * * * *